Patented June 19, 1934

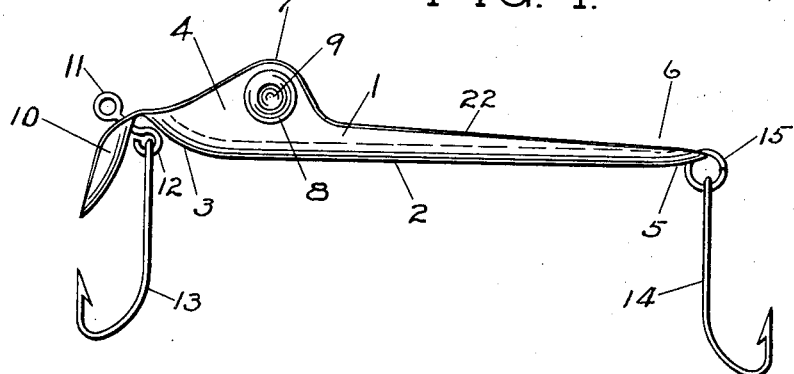
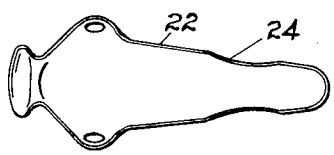
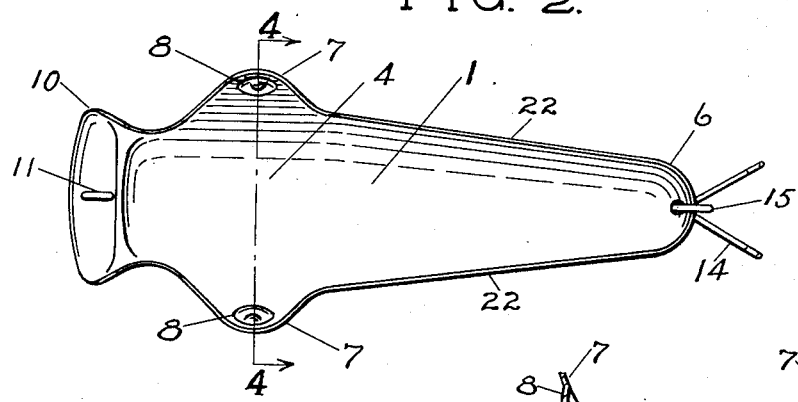
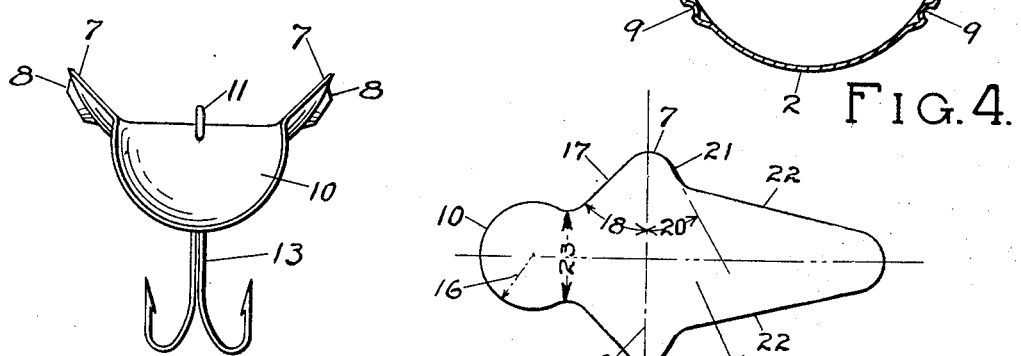

1,963,380

UNITED STATES PATENT OFFICE 1,963,380

FISH LURE

Otto H. Peters, Williamsville, and Albert H. Peters, Buffalo, N. Y.

Application December 16, 1932, Serial No. 647,556

9 Claims. (Cl. 43—42)

This invention relates to certain new and useful improvements in fish lures, and one object of the invention is to provide a fish lure including a body of suitable shape as to simulate a minnow or the like.

Another object is to provide a fish lure which will simulate the actions of a minnow or the like in swimming and especially the motions of a certain class of minnows, some of which make a number of rapid wriggling side motions and then settle down near the bottom of the water, and others of which have a peculiar darting motion.

Another object is to provide a fish lure which will sink of its own weight and so formed that it will maintain itself at different depths in the water by the speed and skill with which it is handled.

With these objects in view, the invention consists in certain features of novelty in the construction, combination and arrangement of parts by which the said objects and certain other objects which will hereinafter appear are attained, the invention being more particularly pointed out in the claims.

In the drawing accompanying and forming a part of this specification,

Figure 1 is a side elevation of our improved fish lure with the hooks hanging in a vertical position.

Figure 2 is a plan view of the fish lure.

Figure 3 is a front elevation of the fish lure.

Figure 4 is a sectional elevation of the fish lure on a line 4—4 of Figure 2.

Figure 5 is a plan view on a reduced scale of a flat piece of metal as blanked out and before being formed in the shape of a completed fish lure.

Figure 6 is a plan of the lure in a modified form.

With reference more in detail to the figures of the drawing it will be seen that the fish lure includes a longitudinal body 1 enlarged at the head end and tapering toward the tail end to somewhat resemble in plan the body of several small fish which are used as bait. These small bait fish are commonly known as skip jack, moddock, mud minnow, johnny darter, rainbow darter, etc.

Body 1 is formed to have the bottom 2 practically straight in a longitudinal direction (Fig. 1) with an upward curve 3 at the head 4 and a slight upward curve 5 at the tail 6. Transversely the body 1 is curved upward on the sides (Fig. 4) so in plan (Fig. 2) the body is shown as having a concave shape. The head 4 at the widest part has extensions 7, 7 in which are formed eyes 8 pressed outward. The central part of eye 8 is pressed inward at 9 forming a pocket to protect the coloring matter of that part of the eye. This pocket 9 can also be used for holding a glass eye when so desired. In the preferred construction, however, the outward projecting eye 8 is painted the desired color and the pocket 9 painted to resemble the pupil.

Attached to the front end of the head 4 and forming a part thereof is a circular shaped lip 10, which is concaved toward the front and bent downward as shown. Through the upper part of lip 10 is fastened a rod having a forwardly extended loop 11 for connecting a fish line and a rearwardly extending loop 12 to which is detachably connected a gang or fish hook 13. Detachably connected to the tail 6 by means of a suitable split ring 15 is a fish hook 14. The hook 13 faces forward while the hook 14 faces backward and when the lure is dragged through the water hooks 13 and 14 will assume a more or less horizontal direction toward the rear.

This lure is preferably formed from sheet metal of suitable thickness for stamping, and of the proper weight, with the lip 10 having a radius 16 (Fig. 5) and the forward edge 17 of the extension 7 being preferably of a greater angle 18 with the transverse line 19, than the angle 20 of the rear edge 21 of said extension. The sides 22 of the body 1 can be formed with straight lines as shown or with a slightly curved line. Forward edge 17 of the extension 7 can also be formed decreasing the connecting metal 23 between the head 4 of the lure and the lip 10.

The lines forming the outline of the blank of the lure together with the angle with which the sides 22 or 24 and the extension 7 are turned up in relation to the bottom 2 has an influence on the swimming action of the lure.

Figure 6 shows a modification of lure as shown in Fig. 2 in that the upturned sides 22 are bent inwardly as as 24 to give a shorter wobbling action and more of a darting effect.

It is thought from the foregoing description, taken in connection with the accompanying drawing that a clear understanding of the operation, construction, utility and advantages of an invention of this character may be had by those skilled in the art.

Having thus described our invention, we claim:

1. A fish lure comprising an elongated body with a head and tail, the sides of said body being turned up and tapering from said head, the bottom of said body being substantially straight longitudinally with turned up ends, said head being provided with upward extensions, eyes in said extensions, and a downwardly extending lip at the front of said head, said lip being concaved toward the front.

2. A fish lure comprising an elongated body having head and a tail, said body being concaved in plan and tapering from said head, said head being provided with upwardly inclined extensions, eyes formed outwardly from said head with the centers thereof pressed inwardly, a downwardly extending lip at a forward angle from the front of said head, a rear hook and means to detachably attach said rear hook to said tail, a front hook and means through said lip to detachably connect said front hook at the rear of said lip and adapted to be connected to a line at the front of said lip.

3. A fish lure comprising an elongated body with a head and a tail, said body having sides and ends turned up and tapering from said head, said head being provided with upwardly and outwardly inclined extensions, the forward edges of said extensions being connected to said head at a greater angle with the transverse center line of said head than the rear edges of said extension and a substantially semi-circular lip extending forwardly and downwardly from the front of said head.

4. A fish lure formed of a single piece of sheet metal and comprising an elongated body with a head and tail, the sides of said body being turned up and tapering from said head, the sides of said body at the forward end being provided with upward extensions above said tapered portions to simulate a head in both plan and elevation, eyes in said extensions, the forward end of said head being curved up, and a downwardly extending lip at a forward angle from the front of said head.

5. A fish lure comprising an elongated body with a head and a tail, said body having its widest part adjacent the forward end and being formed at its widest part with upward extensions, eyes in said extensions, said body tapering from said head to said tail, said head being curved upwardly at its forward end and a lip curved downwardly and extending at a forward angle from the forward end of said head.

6. A fish lure comprising an elongated body with a head and a tail, the sides of said body being turned up and tapering from said head, said head being formed adjacent the forward end and at its widest part with upturned extensions, eyes in said extensions, the bottom of said body being substantially straight longitudinally and curved upwardly at the forward end of the head, and a forwardly and downwardly extending lip from the front of said head to give said lure a wiggling motion when drawn through the water.

7. A fish lure comprising an elongated body concave in plan with its widest portion adjacent the forward end, upturned extensions on said widest portion to simulate a head in elevation and plan, eyes in said extensions, said body tapering from said head and having upturned ends and a downwardly extending lip at a forward angle from the front of said head to give said lure a wobbling motion when drawn through the water.

8. A fish lure composed of a single piece of sheet metal of substantially uniform thickness and comprising an elongated body concave in plan with its widest portion adjacent the forward end, said body tapering from said widest portion and having upturned ends, upward extensions on said widest portion to simulate a head in elevation and plan, eyes pressed out from said extensions, and a circular portion disposed downwardly and forwardly from the front of said head.

9. A fish lure comprising an elongated body having a head end and a tail end and sides concave in plan with its widest portion adjacent said head end, upturned extensions on said widest portion to simulate a head in elevation and plan, eyes in said extensions, said body tapering from said head to said tail, and a downwardly extending lip at a forward angle from the front of said head, a portion of the sides on said tapered portions adjacent said tail end being bent upward at a sharper angle than said concave sides.

OTTO H. PETERS.
ALBERT H. PETERS.